(12) United States Patent
Melgar et al.

(10) Patent No.: US 10,185,342 B2
(45) Date of Patent: Jan. 22, 2019

(54) CONFIGURABLE CHARGE CONTROLLER

(71) Applicant: QUALCOMM Incorporated, San Diego, CA (US)

(72) Inventors: Aaron Melgar, San Martin, CA (US); Christian Sporck, Campbell, CA (US); Chunping Song, Sunnyvale, CA (US); David Wong, Santa Clara, CA (US); Rashed Hoque, Chandler, AZ (US); Neal Horovitz, Los Altos, CA (US); Hector Ivan Oporta, San Jose, CA (US); Daryl Bergstrom, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/703,825

(22) Filed: Sep. 13, 2017

(65) Prior Publication Data

US 2018/0129234 A1    May 10, 2018

Related U.S. Application Data

(60) Provisional application No. 62/417,454, filed on Nov. 4, 2016.

(51) Int. Cl.
*H02M 3/158* (2006.01)
*G05F 1/575* (2006.01)
(Continued)

(52) U.S. Cl.
CPC .............. *G05F 1/575* (2013.01); *G05F 1/563* (2013.01); *H02M 1/4225* (2013.01);
(Continued)

(58) Field of Classification Search
CPC . G05F 1/56; G05F 1/563; G05F 1/565; G05F 1/575; G05F 1/59; H02M 1/4225; H02M 3/156; H02M 3/158; H02M 3/1582; H02M 3/33507; H02M 2001/0045; H02M 2001/156; H02M 2001/158
See application file for complete search history.

(56) References Cited

U.S. PATENT DOCUMENTS

| 7,148,666 | B1 * | 12/2006 | Tai .......................... G05F 1/575 |
| | | | 323/274 |
| 8,148,961 | B2 | 4/2012 | Ha et al. |

(Continued)

FOREIGN PATENT DOCUMENTS

| CN | 202887043 U | 4/2013 |
| DE | 102010041924 A1 | 4/2012 |

(Continued)

OTHER PUBLICATIONS

International Search Report and Written Opinion—PCT/US2017/051594—ISA/EPO—dated Dec. 14, 2017.

*Primary Examiner* — Matthew Nguyen
(74) *Attorney, Agent, or Firm* — Paradice and Li LLP/Qualcomm

(57) ABSTRACT

A configurable charge converter may include an adaptive low-dropout regulator. The adaptive low-dropout regulator may include a headroom detection circuit and a power supply controller. The headroom detection circuit may monitor a voltage drop across a field effect transistor (FET) and cause a programmable power supply to increase or decrease an output voltage accordingly. In some aspects, the configurable charge converter may include an adaptive low-dropout regulator and a buck/boost converter. The output power of the configurable charge controller may be provided by the adaptive low-dropout regulator, the buck/boost converter, or by both the adaptive low-dropout regulator and the buck/boost converter operating in combination.

17 Claims, 7 Drawing Sheets

(51) Int. Cl.
  *H02M 1/42* (2007.01)
  *H02M 3/156* (2006.01)
  *H02M 3/335* (2006.01)
  *G05F 1/563* (2006.01)
  *H02M 1/00* (2006.01)

(52) U.S. Cl.
  CPC ........... *H02M 3/156* (2013.01); *H02M 3/158* (2013.01); *H02M 3/1582* (2013.01); *H02M 3/1588* (2013.01); *H02M 3/33507* (2013.01); *H02M 2001/007* (2013.01); *H02M 2001/0045* (2013.01)

(56) References Cited

U.S. PATENT DOCUMENTS

| | | |
|---|---|---|
| 8,437,154 B2 | 5/2013 | Beaurle et al. |
| 8,488,340 B2 | 7/2013 | Zhang et al. |
| 8,729,877 B2 * | 5/2014 | Ivanov ............... H02M 1/36 323/281 |
| 8,829,868 B2 | 9/2014 | Waltman et al. |
| 8,917,026 B2 | 12/2014 | Ferrier |
| 8,988,054 B2 | 3/2015 | Marty |
| 9,473,023 B2 | 10/2016 | Vannorsdel et al. |
| 9,753,470 B1 * | 9/2017 | Hawley ............... G05F 1/462 |
| 2005/0007178 A1 * | 1/2005 | Fahim ............... H03K 17/063 327/390 |
| 2009/0115384 A1 | 5/2009 | Venes et al. |
| 2014/0015507 A1 | 1/2014 | Park et al. |
| 2014/0176094 A1 * | 6/2014 | Yang ............... G05F 1/62 323/266 |
| 2015/0042300 A1 | 2/2015 | Peker et al. |

FOREIGN PATENT DOCUMENTS

| | | |
|---|---|---|
| EP | 0699986 A2 | 3/1996 |
| EP | 2437385 A2 | 4/2012 |
| WO | WO-2014006440 A1 | 1/2014 |

* cited by examiner

# CONFIGURABLE CHARGE CONTROLLER

CROSS-REFERENCE TO RELATED APPLICATION

This application claims the benefit of and commonly owned U.S. Provisional Patent Application No. 62/417,454 entitled "CONFIGURABLE CHARGE CONTROLLER" filed on Nov. 4, 2016, the entirety of which is hereby incorporated by reference.

TECHNICAL FIELD

The present embodiments relate generally to power converters, and more specifically to configurable power converters for use in portable electronic devices.

BACKGROUND OF RELATED ART

Portable electronic devices are often powered by one or more batteries. Switching power converters are frequently used to charge the batteries as well as provide power to operate the portable electronic devices. However, switching power converters may generate undesirable amounts of heat and, in some cases, electrical switching noise that may affect the operation of the electronic device.

Thus, there is a need to improve power converter operations, especially within portable electronic devices.

SUMMARY

The systems, methods and devices of this disclosure each have several innovative aspects, no single one of which is solely responsible for the desirable attributes disclosed herein.

One innovative aspect of the subject matter described in this disclosure may be implemented as a power regulator comprising an adaptive low-dropout regulator configured to receive a variable output voltage and generate a first output voltage through a first output terminal, a buck/boost converter configured to receive the first output voltage and generate a second output voltage through a second output terminal, a controller configured to control the adaptive low-dropout regulator and the buck/boost converter based at least in part on the variable output voltage, and a regulator output terminal coupled to the second output terminal and configured to provide an output voltage of the power regulator.

Another innovative aspect of the subject matter described in this disclosure may be implemented as an adaptive low-dropout regulator comprising a field effect transistor (FET) configured to receive an output voltage from a variable output power supply, a headroom detection circuit coupled to the FET and configured to measure a voltage difference between source and drain terminals of the FET, and a power supply controller coupled to the headroom detection circuit and configured to adjust the variable output power supply based at least in part on the measured voltage difference.

Another innovative aspect of the subject matter described in this disclosure may be implemented as a power regulator comprising an adaptive low-dropout regulator configured to receive a first intermediate voltage and generate a first output voltage through a first terminal, a buck/boost converter configured to receive the first intermediate voltage and generate a second output voltage through a second output terminal coupled to the first output terminal, a power regulator output terminal configured to receive the first output voltage from the first output terminal and the second output voltage from the second output terminal, and a controller configured to control the adaptive low-dropout regulator and the buck/boost converter based at least in part on a variable input voltage of the power regulator.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

Figure 1:
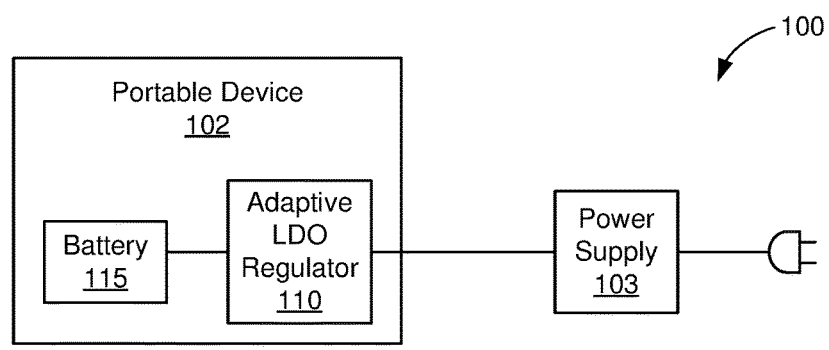
FIG. 1 depicts an example system within which example embodiments may be implemented.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

FIG. 1 depicts an example system 100 within which example embodiments may be implemented. The system 100 may include a portable device 102 and a power supply 103. In some aspects, the portable device 102 may be any technically feasible portable, battery powered electronic device. In some embodiments, the portable device 102 may be a wireless communication device such as a cell phone, tablet, personal digital assistant (PDA), laptop computer, wearable and/or medical device, or the like. The portable device 102 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some embodiments, the portable device 102 may include one or more processing resources (e.g., processors and/or ASICs) and one or more memory resources. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 3 and 6.

The portable device 102 may include an adaptive low-dropout (LDO) regulator 110 coupled to a battery 115. The adaptive LDO regulator 110 may also be coupled to a power supply 103. The power supply 103 may provide a regulated or unregulated source of power to the adaptive LDO regulator 110, which, in turn, may power the portable device 102 and/or charge the battery 115. Although only one battery 115 is shown for simplicity, the portable device 102 may include two or more batteries coupled together in series or in parallel.

Figure 2:
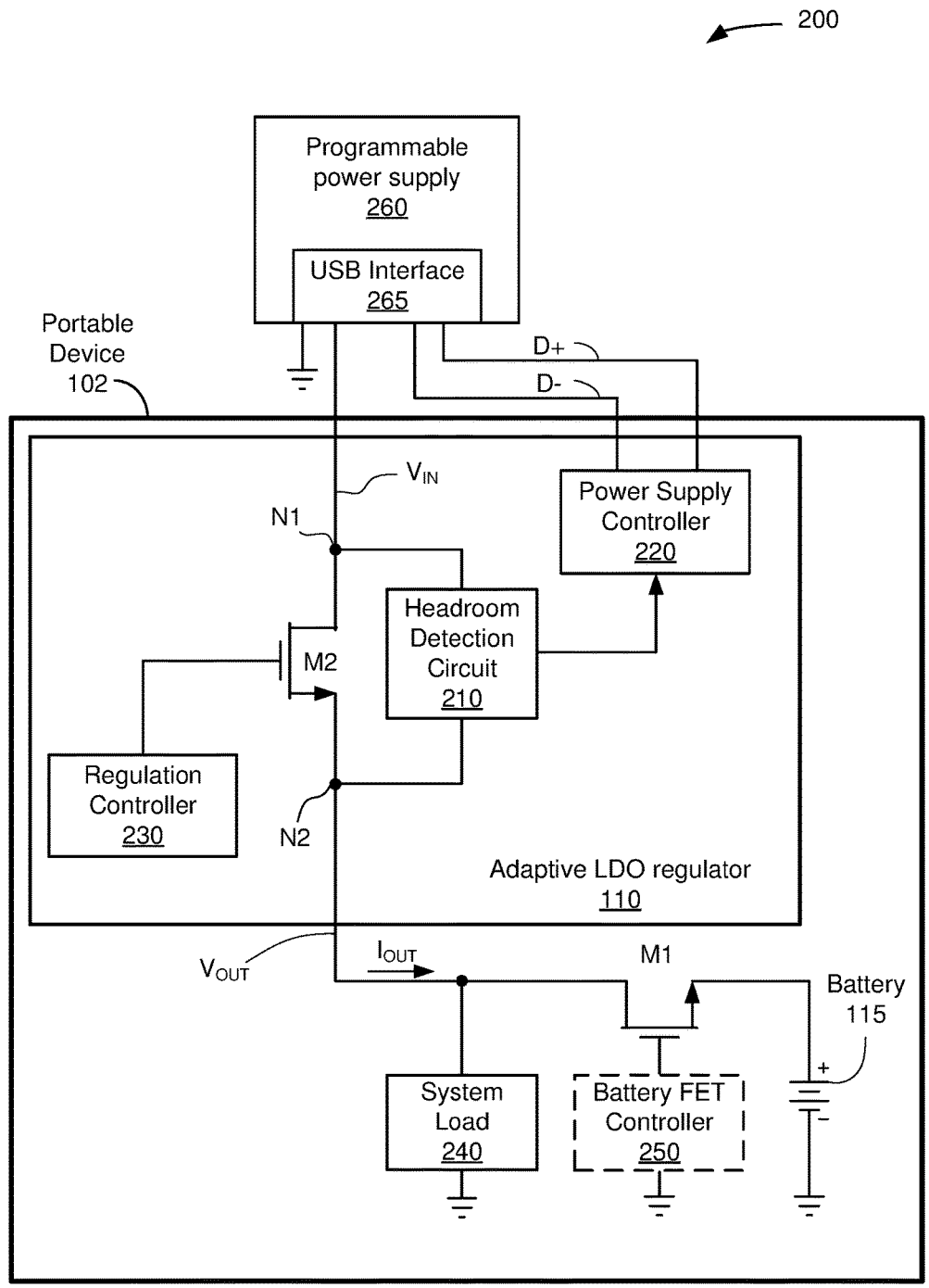
FIG. 2 depicts example aspects of the system of FIG. 1 within which example embodiments may be implemented.

FIG. 2 depicts an example system 200 within which example embodiments may be implemented. The system 200 may include an embodiment of the portable device 102 of FIG. 1 and a programmable power supply 260. In some aspects, the programmable power supply 260 may be a controllable variable output power supply. The portable device 102 may include embodiments of the adaptive LDO regulator 110 and the battery 115 of FIG. 1, a system load 240, an optional battery field effect transistor (FET) controller 250 (shown with dashed lines), and a FET M1. The adaptive LDO regulator 110 may include a headroom detection circuit 210, a power supply controller 220, a regulation controller 230 and a FET M2.

The adaptive LDO regulator 110 may receive a variable input voltage $V_{IN}$ generated by the programmable power supply 260 and generate an output voltage $V_{OUT}$. In some embodiments, the programmable power supply 260 may generate an initial $V_{IN}$ (e.g., a predetermined initial voltage $V_{INIT}$), for example, when the portable device 102 is first powered on, when the portable device 102 is reset, or when the programmable power supply 260 is first connected to the portable device 102. The output voltage $V_{OUT}$ may be coupled to the system load 240 and thereby provide power (e.g., a system voltage) to various systems and/or circuits of the portable device 102. Alternatively, or in addition, the output voltage $V_{OUT}$ optionally may be coupled through the FET M1 to the battery 115. For example, the optional battery FET controller 250 may cause the FET M1 to couple the battery 115 to the output voltage $V_{OUT}$ to charge the battery.

The adaptive LDO regulator 110 may operate the FET M2 as a linear regulator (such as by operating the FET M2 in a linear mode). In some aspects of operating the FET M2 in a linear mode, the voltage drop across the FET M2 may be maintained at a predetermined voltage (for example, 200 millivolts). Furthermore, the equivalent resistance of the FET M2 in the linear mode (e.g., RDS(on)) may be near zero ohms (e.g., 40 milliohms). Thus, any resistive losses associated with current flow through the FET M2 may also be relatively low. Although an example 200 millivolt voltage drop across the FET M2 is described above, other technically feasible voltage drops may be used. In some embodiments, the voltage drop across the FET M2 may be associated with an amount of current provided by the adaptive LDO regulator 110.

The headroom detection circuit 210 may control, at least in part, the voltage drop across the FET M2 by controlling the output of the programmable power supply 260 through the power supply controller 220. For example, the headroom detection circuit 210 may determine (measure) a voltage difference between source and drain terminals of the FET M2 (e.g., a voltage difference between nodes N1 and N2) and may request the output of the programmable power supply 260 be adjusted (through the power supply controller 220) to maintain a predetermined voltage drop across the FET M2. If the headroom detection circuit 210 determines that the voltage difference between the nodes N1 and N2 is greater than the predetermined voltage drop, the headroom detection circuit 210 may request the power supply controller 220 to decrease the output voltage of the programmable power supply 260 (e.g., decrease $V_{IN}$) and thereby decrease the voltage drop across the FET M2. If the headroom detection circuit 210 determines that the voltage difference between the nodes N1 and N2 is less than the predetermined voltage drop, then the headroom detection circuit 210 may request the power supply controller 220 increase the output voltage of the programmable power supply 260 (e.g., increase $V_{IN}$) and thereby increase the voltage drop across the FET M2. In some embodiments, the headroom detection circuit 210 is configured to determine or measure the voltage difference between source and drain terminals of the FET M2 and provide such information to the controller 220 without requesting adjustment of the power supply 260. In such embodiments, the controller 220 may determine whether adjustment is necessary or desired based on the measurements received from the circuit 210.

The regulation controller 230 may control the FET M2 (via a gate terminal of the FET M2) to provide a regulated output voltage $V_{OUT}$ and/or a regulated output current $I_{OUT}$. In some embodiments, the regulation controller 230 may include voltage control loop circuits and/or current control loop circuits to regulate the output voltage $V_{OUT}$ and/or the output current $I_{OUT}$ by controlling the FET M2.

In some embodiments, the power supply controller 220 may communicate with the programmable power supply 260 through a universal serial bus (USB) interface 265. For example, the power supply controller 220 may be coupled through two or more USB terminals (e.g., conductors, data lines, and so on) to the programmable power supply 260. In some aspects, the power supply controller 220 may direct the programmable power supply 260 to increase and/or decrease its output voltage through control signals transmitted through the USB data lines D+ and/or D−. The control signals from the power supply controller 220 to the USB interface 265 may be single-ended or differential signals. In some embodiments, the output voltage of the programmable power supply 260 may be adjusted in voltage step sizes of 20 millivolts. In other embodiments, the output voltage of the programmable power supply 260 may be adjusted in step sizes of any other technically feasible voltage step. For example, a first terminal of the power supply controller 220 may be configured to provide a first signal to increase the output voltage of the power supply 260 (e.g., by a predetermined step amount or by a variable amount) and a second terminal of the power supply controller 220 may be configured to provide a second signal to decrease the output voltage of the power supply 260 (e.g., by the predetermined step amount or by another or variable amount).

Figure 3:
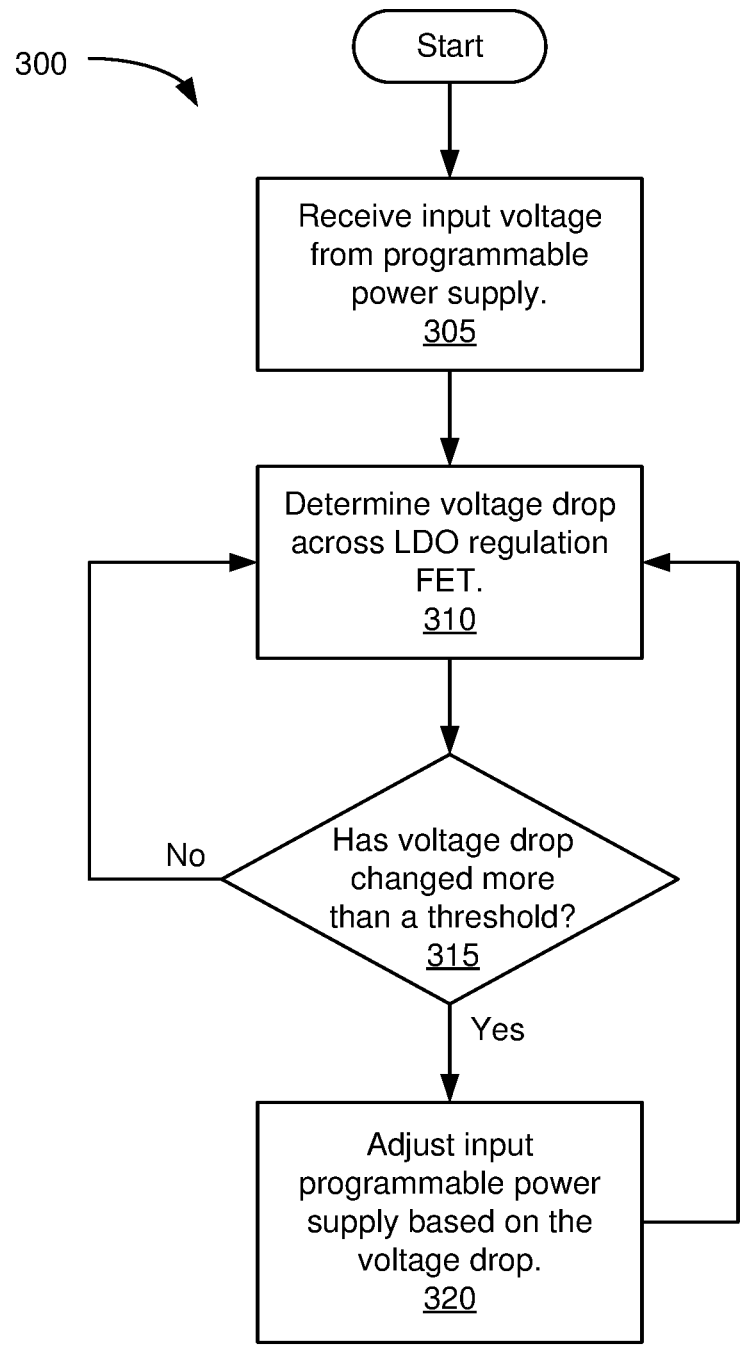
FIG. 3 shows an illustrative flowchart depicting an exemplary operation for operating the adaptive LDO regulator of FIG. 2, in accordance with some embodiments.

FIG. 3 shows an illustrative flowchart depicting an exemplary operation 300 for operating the adaptive LDO regulator 110 of FIG. 2, in accordance with some embodiments. Some embodiments may perform the operations described herein with additional operations, fewer operations, some operations in a different order, and/or some operations in parallel. Referring also to FIG. 2, the adaptive LDO regulator 110 receives an input voltage from the programmable power supply 260 (305). In some embodiments, the programmable power supply 260 may provide a default output voltage (e.g., an initial voltage $V_{INIT}$) when the portable device 102 is first powered on, when the portable device 102 is reset, or when the programmable power supply 260 is first connected to the portable device 102, for example. There may additionally be other situations in which the default output voltage is provided.

Next, the adaptive LDO regulator 110 determines (measures) the voltage drop across an LDO regulation FET (310). For example, the headroom detection circuit 210 may measure the voltage drop across the FET M2. Next, the adaptive LDO regulator 110 determines if the voltage drop is or has changed by more than a threshold voltage (315). For example, the adaptive LDO regulator 110 may determine if the measured voltage drop exceeds a previous voltage drop by more than the threshold voltage (e.g., new voltage drop>(old voltage drop+threshold voltage) or new voltage drop<(old voltage drop−threshold voltage). If the voltage drop has not changed by more than the threshold voltage, the operations return to 310.

On the other hand, if the voltage drop has changed by more than a threshold voltage, then the adaptive LDO regulator 110 provides one or more control signals to adjust the programmable power supply 260 based on the measured voltage drop (320). The adaptive LDO regulator 110 may request adjustment of the programmable power supply 260 to maintain a predetermined voltage drop across the LDO regulation FET. In some aspects, the predetermined voltage drop may cause the LDO regulation FET to operate in the linear mode. For example, if the measured voltage drop is less than a predetermined voltage drop, then the adaptive LDO regulator 110 may increase the output voltage of the programmable power supply 260. In another example, if the measured voltage drop is greater than the predetermined voltage drop, then the adaptive LDO regulator may decrease the output voltage of the programmable power supply 260. In some aspects, power supply adjustments for the programmable power supply may be provided through one or more USB signals. Operation then returns to 310.

Figure 4:
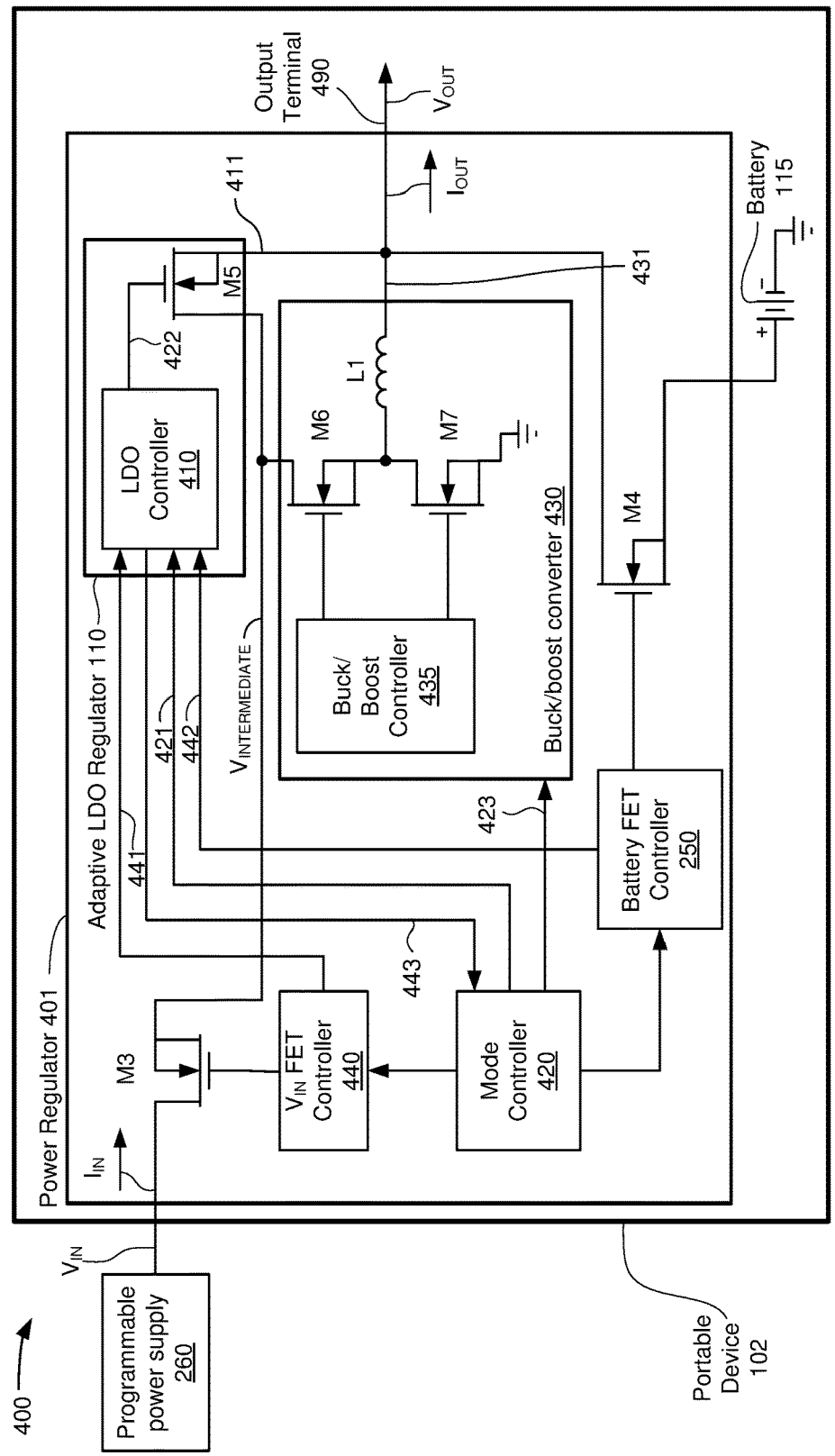
FIG. 4 depicts other example aspects of the system of FIG. 1 within which example embodiments may be implemented.

FIG. 4 depicts another example system 400 within which example embodiments may be implemented. The system 400 may include an embodiment of the portable device 102 of FIG. 1 and the programmable power supply 260 of FIG. 2. In some aspects, the programmable power supply 260 may include a USB interface (not shown for simplicity) to deliver a voltage $V_{IN}$ to the portable device 102 as well as to receive control signals to increase and/or decrease the voltage $V_{IN}$. The portable device 102 may include a power regulator 401 and an embodiment of the battery 115 of FIG. 2. The power regulator 401 may include embodiments of the adaptive LDO regulator 110 and the battery FET controller 250 of FIG. 2. In addition, the power regulator 401 may include a mode controller 420, a buck/boost converter 430, a $V_{IN}$ FET controller 440, a FET M3, and a FET M4.

The power regulator 401 may receive the voltage $V_{IN}$ from the programmable power supply 260 and provide an intermediate voltage $V_{INTERMEDIATE}$ through the FET M3. In some aspects, the FET M3 may be operated in a linear (e.g., triode) mode by the $V_{IN}$ FET controller 440. Thus, the voltage $V_{INTERMEDIATE}$ may be similar to the voltage $V_{IN}$ provided by the programmable power supply 260. In addition, the $V_{IN}$ FET controller 440 may monitor input current $I_N$ through the FET M3. Due to the operating voltages ($V_{IN}$, $V_{INTERMEDIATE}$, and a gate voltage of the FET M3), the FET M3 may advantageously not require bulk switching, thereby simplifying the design of the power regulator 401.

The voltage $V_{INTERMEDIATE}$ may be coupled to the Adaptive LDO regulator 110 and the buck/boost converter 430. The adaptive LDO regulator 110 may include an LDO controller 410 and a FET M5. The FET M5 may receive the voltage $V_{INTERMEDIATE}$ and generate a LDO output voltage through an output terminal 411. The output terminal 411 may be coupled to an output terminal 490 of the power regulator 401. Thus, in some aspects, the LDO output voltage may be the output voltage $V_{OUT}$ of the power regulator 401. As described above with respect to FIG. 2, the FET M5 may be operated as an LDO regulator. In some embodiments, the LDO controller 410 may include one or more circuits, blocks and/or modules described above with respect to FIG. 2 to operate the FET M5 in the linear mode. For example, the LDO controller 410 may include the headroom detection circuit 210, and/or the regulation controller 230 of FIG. 2 (not shown for simplicity).

The buck/boost converter 430 may include a buck/boost controller 435, a high-side FET M6, a low-side FET M7 and an inductor L1. The buck/boost converter 430 may receive the voltage $V_{INTERMEDIATE}$ and generate a buck/boost output voltage through an output terminal 431. The buck/boost converter 430 may be a switching voltage regulator that may generate a step-up voltage (e.g., a voltage greater than $V_{INTERMEDIATE}$) or a step-down voltage (e.g., a voltage less than $V_{INTERMEDIATE}$) through the high-side FET M6, the low-side FET M7, and/or the inductor L1. Operation of the high-side FET M6 and the low-side FET M7 may be controlled by the buck/boost controller 435. The inductor L1 may deliver the buck/boost output voltage to the output terminal 431. The output terminal 431 may also be coupled to the output terminal 490. Thus, output terminals from both the adaptive LDO regulator 110 and the buck/boost converter 430 may be coupled to the output terminal 490. In this manner, the output voltage $V_{OUT}$ and output current $I_{OUT}$ for the portable device 102 may be provided by the adaptive LDO regulator 110 and/or the buck/boost converter 430.

The battery 115 may be charged by a voltage and current on the output terminal 490. For example, the FET M4, controlled by the battery FET controller 250, may selectively couple the battery 115 to the output terminal 490 when the output voltage $V_{OUT}$ is sufficient to charge the battery 115. In some embodiments, the battery FET controller 250 may monitor a charge current and/or a charge voltage delivered to the battery 115 through the FET M4.

The mode controller 420 may control the voltage $V_{IN}$ from the programmable power supply 260. For example, the mode controller 420 may include the power supply controller 220 of FIG. 2 (not shown for simplicity). The voltage $V_{IN}$ may be adjusted to maintain linear operation of the FET M5, and/or to provide sufficient voltage for effective operation of the buck/boost converter 430. In some embodiments, the LDO controller 410 may control the programmable power supply 260 (e.g., $V_{IN}$) through the mode controller 420. For example, the LDO controller 410 may receive information regarding current provided by the FET M3 through current sense signal 441 and current provided by the FET M4 through current sense signal 442. Based on these current sense signals, the LDO controller 410 may request an adjustment of the voltage $V_{IN}$ through a voltage request signal 443 to the mode controller 420.

Power from the power regulator 401 (e.g., $V_{OUT}$) may be supplied by the adaptive LDO regulator 110 or by the buck/boost converter 430 based, at least in part, on an operating mode of the power regulator 401. In some aspects, the operating mode may be determined by the mode controller 420. For example, the mode controller 420 may monitor input voltage levels ($V_{IN}$), monitor output voltage levels ($V_{OUT}$), monitor a target output voltage, and/or monitor output current ($I_{OUT}$) to determine the operating mode of the power regulator 401. By way of example and not limitation, possible operating modes of the power regulator 401 include an LDO regulation mode, a buck converter mode, and a boost converter mode.

If the voltage $V_{IN}$ is greater than the target output voltage and within a predetermined voltage difference of target output voltage, then the mode controller 420 may operate the power regulator 401 in the LDO regulation mode. In this mode, the mode controller 420 may cause the FET M3 (through the $V_{IN}$ FET controller 440) to provide voltage $V_{INTERMEDIATE}$. In addition, the mode controller 420 may cause the FET M5 (through the LDO controller 410, adaptive LDO regulator control signal 421, and a FET control signal 422) to operate as a linear regulator and provide the LDO output voltage to the output terminal 490. The mode controller 420 may cause the buck/boost controller 435 (through a buck/boost control signal 423) to isolate the buck/boost converter 430 from the output terminal 490 (e.g., turn off FETs M6 and M7).

If the voltage $V_{IN}$ is greater than the target output voltage by more than a predetermined voltage difference, then the mode controller 420 may operate the power regulator 401 in a buck converter mode. In this mode, the mode controller 420 may cause the FET M3 (through the $V_{IN}$ FET controller 440) to provide the voltage $V_{INTERMEDIATE}$. The mode controller 420 may cause the buck/boost converter 430 (through the buck/boost control signal 423) to generate the buck/boost output voltage from a relatively higher voltage $V_{INTERMEDIATE}$ (e.g., operate the buck/boost converter 430 as a buck converter). In some aspects, the buck/boost controller 435 may operate the FET M7 as a switching FET while FET M6 is kept enabled (turned on). In addition, the mode controller 420 in the buck converter mode may disable (turn off) the FET M5 (through the LDO controller 410) to isolate the adaptive LDO regulator 110 from the output terminal 490.

If the voltage $V_{IN}$ is less than the target output voltage, then the mode controller 420 may operate the power regulator 401 in a boost converter mode. In this mode, the mode controller 420 may cause the FET M3 (through the $V_{IN}$ FET controller 440) to provide the voltage $V_{INTERMEDIATE}$. The mode controller 420 may cause the buck/boost converter 430 (through the buck/boost control signal 423) to generate the buck/boost output voltage from a lower voltage $V_{INTERMEDIATE}$ (e.g., operate the buck/boost converter 430 as a boost converter). In some aspects, the buck/boost controller 435 may operate the FET M6 as a switching FET and turn off the FET M7. In addition, the mode controller 420 may disable (turn off) the FET M5 (through the LDO controller 410) to isolate the adaptive LDO regulator 110 from the output terminal 490.

As described above, the voltage $V_{IN}$ may be controlled by the power regulator 401 (for example, through the mode controller 420). Thus, the voltage $V_{IN}$ may be adjusted to optimize operation of the power regulator 401 for a selected operating mode. Example operations of FETs M5, M6, and M7 with respect to operating modes of the power regulator 401 are summarized below in Table. 1.

TABLE 1

| Operating Mode | FET M5 | FET M6 | FET M7 | $V_{OUT}$ Provided by: |
|---|---|---|---|---|
| LDO Regulation Mode | On (as linear regulator) | Off | Off | Adaptive LDO Regulator 110 |
| Buck Converter Mode | Off | On | Switching | Buck/Boost Converter 430 |
| Boost Converter Mode | Off | Switching | Off | Buck/Boost Converter 430 |

In some embodiments, the FET M3 may be configured to regulate the voltage $V_{IN}$ (in contrast to the FET M5, described above) when in the LDO regulation mode. The FET M5 may instead be on and operated in the triode region. Since the FET M3 may be an internal FET with a relatively better compensation loop, the FET M3 may provide increased operational stability in certain embodiments.

In some embodiments, the mode controller 420 may control the power regulator 401 based on environmental conditions. For example, the mode controller 420 may adjust the output current $I_{OUT}$ based, at least in part, on a detected temperature. One or more temperature sensors (not shown for simplicity) may be disposed near and/or within the power regulator 401. Possible temperature sensors locations may include the die including the power regulator 401, on (or adjacent to) a housing of the portable device 102, and/or other regions adjacent to the power regulator 401. As the detected temperature rises, the mode controller 420 may cause the adaptive LDO regulator 110 and/or the buck/boost converter 430 to reduce the output current $I_{OUT}$ so that the temperature is maintained below a maximum operating temperature. If the maximum operating temperature is exceeded, then the mode controller 420 may cause the adaptive LDO regulator 110 and/or the buck/boost converter 430 to shut down enabling the power regulator 401 to cool down. If the temperature returns below the maximum operating temperature, then the mode controller 420 may cause the adaptive LDO regulator 110 and/or the buck/boost converter 430 to again generate the output current $I_{OUT}$.

In another embodiment, the FET M5 shown in FIG. 4 may be removed from adaptive regulator 110. In its place, the FET M3 may be coupled to the LDO controller 410 such that, in a first configuration (e.g., operating in an LDO regulation mode), the voltage $V_{IN}$ may be regulated by the FET M3 and the FET M6 may be enabled to deliver power (e.g., the LDO output voltage) to the output terminal 490. In a second configuration (e.g., operating in a buck or boost converter mode), the voltage $V_{IN}$ (coupled via by the FET M3) may be regulated by the buck/boost converter 430. In both configurations, since the external FET M5 is removed from the power regulator 401, design cost and complexity may be reduced. This embodiment is described in more detail below in conjunction with FIG. 5.

Figure 5:
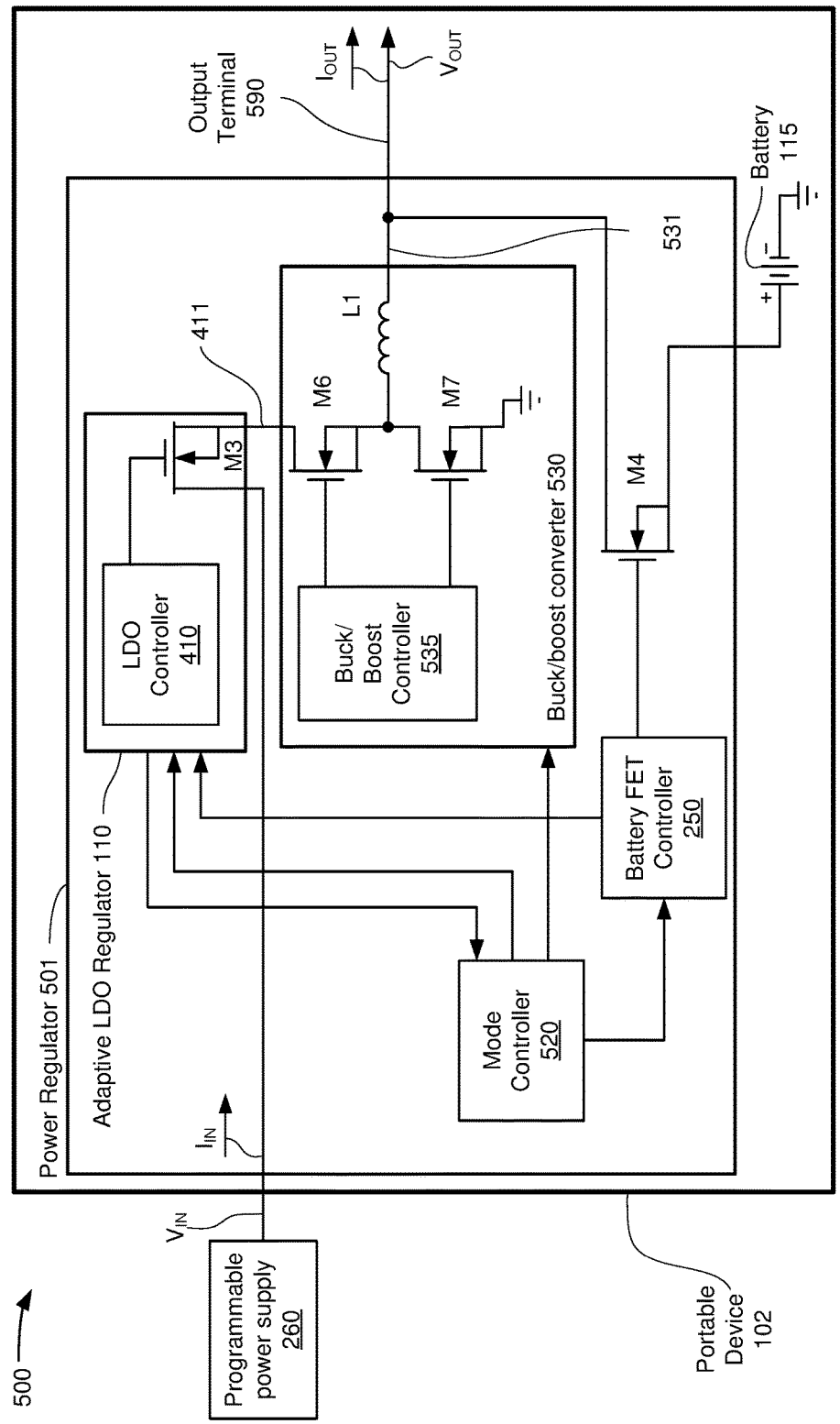
FIG. 5 depicts still other example aspects of the system of FIG. 1 within which example embodiments may be implemented.

FIG. 5 depicts another example system 500 within which example embodiments may be implemented. Similar to the system 400 of FIG. 4, the system 500 may include an embodiment of the portable device 102 of FIG. 1 and the programmable power supply 260 of FIG. 2. In some aspects, the programmable power supply 260 may include a USB interface (not shown for simplicity) to deliver a voltage $V_{IN}$ to the portable device 102 as well as to receive control signals to increase and/or decrease the voltage $V_{IN}$. The portable device 102 may include a power regulator 501, a mode controller 520, a buck/boost converter 530, and an embodiment of the battery 115 of FIG. 2. The power regulator 501 may include embodiments of the adaptive LDO regulator 110 and the battery FET controller 250 of FIG. 2. In addition, the power regulator 501 may include an embodiment of the LDO controller 410, described above with respect to FIG. 4.

The adaptive LDO regulator 110 may include the FET M3 and may receive the voltage $V_{IN}$ from the programmable power supply 260. The output terminal 411 may provide the LDO output voltage to the buck/boost converter 530. The buck/boost converter 530, in turn, receives the LDO output voltage and can either provide the LDO output voltage to an output terminal 590 (when the power regulator 501 is operating in the LDO regulation mode), increase the LDO output voltage (when the power regulator 501 is operating in the boost converter mode), or decrease the LDO output voltage (when the power regulator 501 is operating in the buck converter mode). An output terminal 531 of the buck/boost converter 530 may be coupled to the output terminal 590.

In some aspects, the operating mode of the power regulator 501 may be determined by the mode controller 520. For example, the mode controller 520 may monitor input voltage levels ($V_{IN}$), monitor output voltage levels ($V_{OUT}$), monitor the target output voltage, and/or monitor output current ($I_{OUT}$) to determine the operating mode of the power regulator 501. For example, if voltage $V_{IN}$ is greater than the target output voltage and within a predetermined voltage of the target output voltage, then the mode controller 520 may operate the power regulator 501 in the LDO regulation mode. In this mode, the mode controller 520 may cause the FET M3 to linearly regulate the voltage $V_{IN}$ and provide the LDO output voltage. The mode controller 520 may also cause the FET M6 to be enabled and cause the FET M7 to be turned off by the buck/boost controller 535.

In another example, if voltage $V_{IN}$ is much greater than a target output voltage by more than the predetermined voltage difference, then the mode controller 520 may operate the power regulator 501 in the buck converter mode. The mode controller 520 may cause the adaptive LDO regulator 110 to "pass through" the voltage $V_{IN}$ (by turning the FET M3 on). The mode controller 520 may also cause the buck/boost converter 530 (through the buck/boost controller 535) to operate as a buck converter by turning on the FET M6 and switching the FET M7.

In another example, if YIN is less than $V_{OUT}$, then the mode controller 520 may operate the power regulator 501 in the boost converter mode. Similar to the buck converter mode, the mode controller 520 may cause the adaptive LDO regulator 110 to "pass through" the voltage $V_{IN}$ (by turning on the FET M3) to the buck/boost converter 530. The mode controller 520 may also cause the buck/boost converter 530 to operate as a boost converter (through the buck/boost controller 535) by switching the FET M6 and turning off the FET M7. Example operations of FETs M3, M6, and M7 with respect to operating modes of the power regulator 501 are summarized below in Table. 2.

TABLE 2

| Operating Mode | FET M3 | FET M6 | FET M7 | $V_{OUT}$ Provided by: |
|---|---|---|---|---|
| LDO Regulation Mode | On (as a linear regulator) | On | Off | Adaptive LDO Regulator 110 |
| Buck Converter Mode | On | On | Switching | Buck/Boost Converter 530 |
| Boost Converter Mode | On | Switching | Off | Buck/Boost Converter 530 |

The power regulator 501 may provide similar functionality (with respect to input and output voltages) as the power regulator 401 described in FIG. 4. However, the power regulator 501 may have a simpler design since the adaptive LDO regulator 110 of FIG. 5 may provide power to the buck/boost converter 530 as well as provide a regulated output voltage. In one example operating mode, the adaptive LDO regulator 110 of FIG. 5 may simply pass a voltage from the programmable power supply 260 to the buck/boost converter 530 (in a manner like the FET M3 of FIG. 4). In another example operating mode, the adaptive LDO regulator 110 of FIG. 5 may provide a regulated voltage (through the FET M3 of FIG. 5) that may be coupled to the output terminal 590 by the FET M6. Thus, the adaptive LDO regulator 110 of FIG. 5 may perform operations provided by the FET M3, the controller 440, and the adaptive LDO regulator 110 of FIG. 4 with potentially fewer parts. The simpler design of the power regulator 501 may reduce associated costs and increase reliability.

Figure 6:
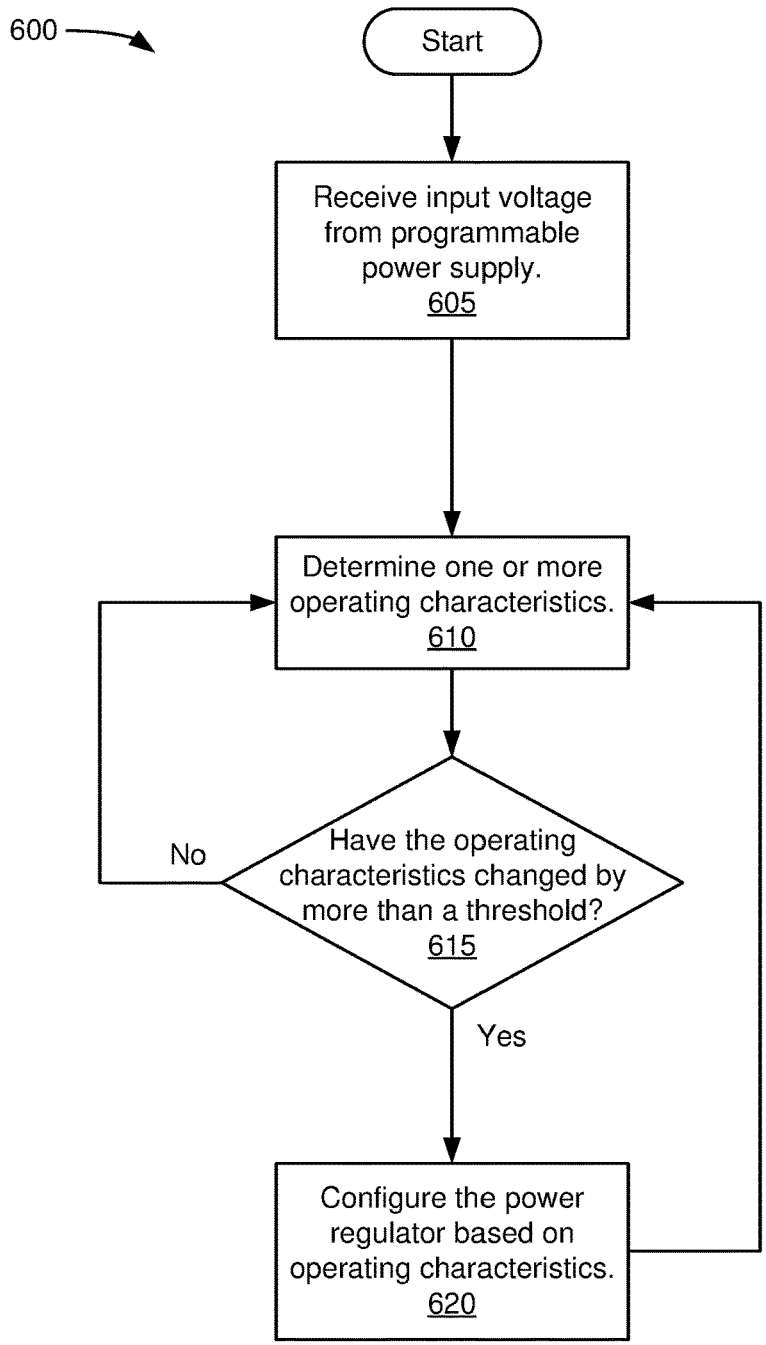
FIG. 6 shows an illustrative flowchart depicting an exemplary operation for operating the power regulator of FIGS. 5 and/or 6, in accordance with some embodiments.

FIG. 6 shows an illustrative flowchart depicting an exemplary operation 600 for operating a power regulator, such as the power regulator 401 of FIG. 4 and the power regulator 501 of FIG. 5, in accordance with some embodiments. For ease of discussion, similar elements in FIGS. 4 and 5 are referred to by their name (e.g., power regulator, mode controller, etc.) and their element numbers within their respective figures. The operation begins as the power regulator 401/501 receives an input voltage from the programmable power supply 260 (605). Next, the mode controller 420/520 determines one or more operating characteristics (610). For example, the mode controller 420/520 may determine (measure) the input voltage, determine the output voltage, determine the output current and/or determine one or more environmental conditions (e.g., temperature) associated with the power regulator 401/501.

Next, the mode controller 420/520 determines if the operating characteristics have changed by more than a threshold (615). For example, the mode controller 420/520 may determine if a new measurement of an input voltage, an output voltage, or an output current differs (by more than a threshold voltage) from a previous measurement of an input voltage, an output voltage, or an output current. In addition, the mode controller may determine if a new environmental condition (e.g., a temperature) differs (by more than a threshold) a previously determined environment condition. If the operating characteristics have not changed by more than a threshold, then operations return to (610)

On the other hand, if operating characteristics have changed by more than a threshold, then the mode controller 420/520 configures the power regulator 401/501 based on the determined operating characteristics (620). For example, the mode controller 420/520 may configure the adaptive LDO regulator 110 and/or the buck/boost converter 430/530 to generate the output voltage based on the determined input voltage, output voltage, output current and/or environmental conditions. In some aspects, the mode controller 420/520 may configure the power regulator 401/501 to operate in an LDO regulation mode, a buck converter mode, or a boost converter mode based on input voltage, output voltage, output current and/or environmental conditions. As described above with respect to FIGS. 4 and 5, the mode controller 420/520 may cause one or more elements within the power regulator 401/501 to generate and/or regulate an output voltage $V_{OUT}$ and/or output current $I_{OUT}$ based on an input voltage and/or environmental operating conditions. The operation returns to 610.

As discussed above, elements of the adaptive LDO regulator 110 illustrated in and discussed with respect to FIG. 2 may be implemented in the embodiments of the adaptive LDO regulator 110 illustrated in FIGS. 4 and 5. In such embodiments, the functions described with respect to 310 and/or 315 in FIG. 3 may be performed pursuant to 610 and/or 615. Further, a programmable power supply (e.g., the power supply 260) may be adjusted or programmed based thereon, for example as described with respect to FIG. 2. In some embodiments, the functions described with respect to 320 are performed as part of the operation 600 based on 610 and/or 615.

While illustrated separately in FIGS. 2, 4, and 5, one or more of the controllers 220, 250, 410, 440, 520, and/or 535 may be implemented in a common device, processor, control logic, etc. For example, one or more of these controllers may be implemented on a power management integrated circuit (PMIC) on which the power regulator 401 or 501 is implemented. In some embodiments, each of the controllers is implemented in a separate control unit on the PMIC. Other configurations may be implemented as well. For example, an embodiment is described in further detail below in which a processor and control software are implemented separate from the power regulator.

Figure 7:
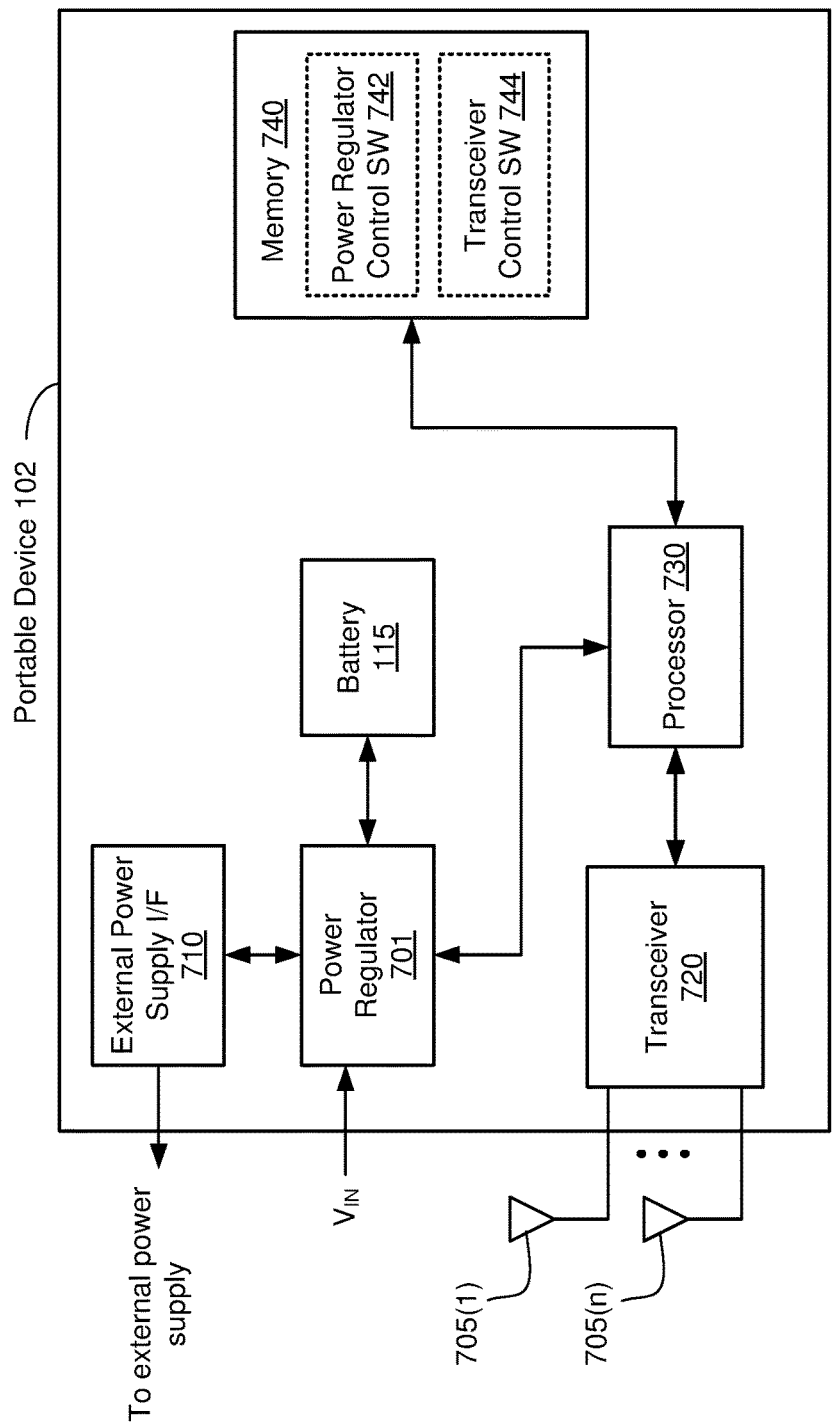
FIG. 7 shows a block diagram of an example embodiment of the portable device 102 of FIGS. 1, 2, 5 and 6.

FIG. 7 shows a block diagram of an example embodiment of the portable device 102. The portable device 102 includes an embodiment of the battery 115. The portable device 102 may also include a power regulator 701, antennas 705(1)-705(n), an external power supply interface 710, a transceiver 720, a processor 730, and a memory 740. The transceiver 720, which may be coupled to the antennas 705(1)-705(n), may transmit signals to and receive signals from other wireless devices. The transceiver 720 may include one or more receive chains (not shown for simplicity) to receive data transmissions including, for example, single user (SU) and (multiple user) MU-MIMO (multiple input, multiple output) data transmissions through the antennas 705(1)-705(n). In addition, the transceiver 720 may also include one or more transmit chains (not shown for simplicity) to transmit data transmissions including, for example, SU and MU-MIMO data transmissions through the antennas 705(1)-705(n).

The power regulator 701 may be an embodiment of the power regulator 401 of FIG. 4 and/or the power regulator 501 of FIG. 5 and may receive an input voltage $V_{IN}$ and may generate an output voltage $V_{OUT}$ (not shown for simplicity) to power, at least in part, the portable device 102. In some embodiments, the power regulator 701 may include an adaptive LDO regulator 110 and/or a buck/boost converter (e.g., buck/boost converter 430 of FIG. 4 and/or buck/boost converter 530 of FIG. 5). An adaptive LDO regulator and buck/boost converter is not shown in FIG. 7 for simplicity. The power regulator 701 may also provide a charge voltage and current to the battery 115.

The external power supply interface 710, coupled to the power regulator 701, may provide an electrical interface to control an external power supply (not shown for simplicity) providing the input voltage $V_{IN}$ to the portable device 102. In some embodiments, the external power supply interface 710 may include the headroom detection circuit 210 and/or the power supply controller 220 of FIG. 2.

The memory 740 may include a non-transitory computer-readable storage medium (e.g., one or more nonvolatile memory elements, such as EPROM, EEPROM, Flash memory, a hard drive, etc.) that may store the following software modules:

- a power regulator control software (SW) module 742 to control the power regulator 701; and
- a transceiver control SW module 744 to control the transceiver 720.

Each software module includes program instructions that, when executed by the processor 730, may cause the portable device 102 to perform the corresponding function(s). Thus, the non-transitory computer-readable storage medium of memory 740 may include instructions for performing all or a portion of the operations of FIGS. 3 and/or 6.

Processor 730, which is coupled to power regulator 701, transceiver 720, and memory 740, may be any one or more suitable processors capable of executing scripts or instructions of one or more software programs stored in the portable device 102 (e.g., within the memory 740).

The processor 730 may execute the power regulator control SW module 742 to provide power for the portable device 102 and/or charge the battery 115. In some embodiments, execution of the power regulator control SW module 742 may determine (measure) a voltage drop across a FET operating in a linear mode and request an adjustment of a voltage provided by an external power supply based, at least in part, on the determined voltage drop. For example, the processor 730 executing the power regulator control SW module 742 may provide the functionality of the headroom detection circuit 210 and/or the power supply controller 220 of FIG. 2. In other embodiments, execution of the power regulator control SW module 742 may determine an operating mode of the power regulator 701. For example, the processor 730 executing the power regulator control SW module 742 may provide the functionality of the adaptive LDO regulator 110, the mode controller 420/520, and/or the buck/boost converter 430/530 of FIGS. 4 and 5.

Processor 730 may execute the transceiver control SW module 744 to control wireless transmissions and/or receptions through the transceiver 720. In some aspects, the transceiver control SW module 744 may be executed by the processor 730 to select and/or change wireless channels, and/or transmit MU-MIMO data transmissions to one or more MU groups.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A power regulator comprising:
an adaptive low-dropout regulator configured to receive a variable output voltage, linearly regulate the variable output voltage to generate a first output voltage through a first output terminal in a first operating mode, and pass through the variable output voltage to the first output terminal in a second and a third operating mode;
a buck/boost converter configured to receive the first output voltage and generate a second output voltage through a second output terminal;
a controller configured to control the adaptive low-dropout regulator and the buck/boost converter based at least in part on the variable output voltage; and
a regulator output terminal coupled to the second output terminal and configured to provide an output voltage of the power regulator.

2. The power regulator of claim 1, further comprising:
a controller configured to:
determine a target output voltage of the power regulator; and
control the adaptive low-dropout regulator and the buck/boost converter based at least in part on the variable output voltage and the target output voltage.

3. The power regulator of claim 2, wherein the controller is further configured to determine the operating mode of the power regulator based at least in part on the variable output voltage, the target output voltage, and an input current.

4. The power regulator of claim 3, wherein the buck/boost converter is configured to step-up the first output voltage in the second operating mode and step-down the first output voltage in the third operating mode.

5. The power regulator of claim 1, wherein the controller is configured to control a power supply configured to provide the variable output voltage.

6. An adaptive low-dropout regulator comprising:
a field effect transistor (FET) configured to receive an output voltage from a variable output power supply;
a headroom detection circuit coupled to the FET and configured to measure a voltage difference between source and drain terminals of the FET; and
a power supply controller coupled to the headroom detection circuit and configured to adjust the variable output power supply based at least in part on the measured voltage difference, comprising:
a first output configured to provide a first signal to increase the output voltage of the variable output power supply, and
a second output configured to provide a second signal to decrease the output voltage of the variable output power supply, wherein the first output is separate from the second output.

7. The adaptive low-dropout regulator of claim 6, wherein the power supply controller is further configured to maintain a first voltage difference between the source and drain terminals of the FET by controlling the output voltage of the variable output power supply.

8. The adaptive low-dropout regulator of claim 6, wherein the FET is configured to operate in a linear mode based at least in part on the output voltage from the variable output power supply.

9. The adaptive low-dropout regulator of claim 6, wherein the FET is configured to provide a system voltage for a system load.

10. The adaptive low-dropout regulator of claim 9, wherein the power supply controller is configured to adjust the variable output power supply to maintain the measured voltage difference between the output voltage of the variable output power supply and the system voltage.

11. The adaptive low-dropout regulator of claim 6 further comprising a FET controller coupled to the FET and configured to control a gate voltage based at least in part on a detected current or detected voltage.

12. A power regulator comprising:
an adaptive low-dropout regulator configured to receive a first intermediate voltage and generate a first output voltage through a first output terminal;
a buck/boost converter configured to receive the first intermediate voltage and generate a second output voltage through a second output terminal coupled to the first output terminal;
a power regulator output terminal configured to receive the first output voltage from the first output terminal and the second output voltage from the second output terminal;
a controller configured to control the adaptive low-dropout regulator and the buck/boost converter based at least in part on a variable input voltage of the power regulator; and
a first field effect transistor (FET) configured to receive the variable input voltage and generate the first intermediate voltage for the adaptive low-dropout regulator and the buck/boost converter.

13. The power regulator of claim 12, further comprising:
a FET controller configured to operate the first FET as a linear regulator.

14. The power regulator of claim 12, wherein the controller is configured to:
determine a target output voltage of the power regulator;
determine an operating mode of the power regulator based at least in part on the variable input voltage and the target output voltage of the power regulator; and
control the adaptive low-dropout regulator and the buck/boost converter based at least in part on the operating mode of the power regulator.

15. The power regulator of claim 14, wherein the controller is configured to:
enable the adaptive low-dropout regulator and disable the buck/boost converter if the operating mode of the power regulator is a first operating mode; and
disable the adaptive low-dropout regulator and enable the buck/boost converter if the operating mode of the power regulator is a second operating mode.

16. The power regulator of claim 12, wherein the adaptive low-dropout regulator comprises:
a second FET configured to receive the first intermediate voltage, and generate the first output voltage.

17. The power regulator or claim 16, wherein the second FET is configured to operate in a linear mode.

* * * * *